US012431765B2

(12) United States Patent
Johnson

(10) Patent No.: US 12,431,765 B2
(45) Date of Patent: Sep. 30, 2025

(54) COOLING SYSTEM AND METHOD FOR SLEEVE BEARING MOTORS

(71) Applicant: Toshiba International Corporation, Houston, TX (US)

(72) Inventor: Scott Johnson, Tomball, TX (US)

(73) Assignee: Toshiba International Corporation, Houston, TX (US)

( * ) Notice: Subject to any disclaimer, the term of this patent is extended or adjusted under 35 U.S.C. 154(b) by 227 days.

(21) Appl. No.: 18/322,261

(22) Filed: May 23, 2023

(65) Prior Publication Data

US 2023/0396129 A1 Dec. 7, 2023

Related U.S. Application Data

(60) Provisional application No. 63/349,869, filed on Jun. 7, 2022.

(51) Int. Cl.
*H02K 9/04* (2006.01)
*F16C 37/00* (2006.01)
*H02K 7/08* (2006.01)

(52) U.S. Cl.
CPC ............... *H02K 9/04* (2013.01); *H02K 7/08* (2013.01)

(58) Field of Classification Search
CPC .......... H02K 7/08; H02K 9/04; F16C 37/007; F16C 37/00
USPC .............. 384/476, 320; 310/58, 60 R, 63, 90
See application file for complete search history.

(56) References Cited

U.S. PATENT DOCUMENTS

| | | | | |
|---|---|---|---|---|
| 4,186,319 A | * | 1/1980 | Dochterman | H02K 5/15 310/90 |
| 4,326,757 A | * | 4/1982 | Ozaki | H02K 5/1672 310/90 |
| 4,661,734 A | * | 4/1987 | Capuano | H02K 5/1672 310/90 |
| 6,774,514 B2 | * | 8/2004 | Matsuoka | H02K 5/207 310/58 |
| 7,701,096 B2 | * | 4/2010 | Noda | B60L 3/0061 310/57 |
| 10,298,087 B2 | * | 5/2019 | Chernogorski | H02K 5/203 |
| 11,817,759 B2 | * | 11/2023 | Kamppuri | H02K 5/1672 |

FOREIGN PATENT DOCUMENTS

JP S61136022 A * 6/1986 ............. F16C 37/00

OTHER PUBLICATIONS

Canadian office action mailed Mar. 28, 2025, Canadian Application No. 3,202,323, 4 pages.

* cited by examiner

*Primary Examiner* — Burton S Mullins
(74) *Attorney, Agent, or Firm* — Baker Botts L.L.P.

(57) ABSTRACT

An electric motor includes: a motor fan located proximate a first end of the electric motor; a sleeve bearing disposed between a rotating portion of the electric motor and a non-rotating portion of the electric motor, the sleeve bearing located proximate a second end of the electric motor opposite the first end; at least one air intake configured to receive an airflow from the motor fan and direct the airflow toward the second end of the electric motor; and an air discharge box coupled to a longitudinal end of the at least one air intake and configured to direct the airflow received into the air discharge box toward the sleeve bearing.

18 Claims, 6 Drawing Sheets

COOLING SYSTEM AND METHOD FOR SLEEVE BEARING MOTORS

CROSS-REFERENCE TO RELATED APPLICATIONS

The present application claims priority to U.S. Provisional Application No. 63/349,869, filed on Jun. 7, 2022, the content of which is incorporated herein by reference in its entirety.

TECHNICAL FIELD

The presently disclosed subject matter relates to a cooling system and a cooling method, more particularly, to a cooling system and a cooling method for sleeve bearing motors.

BACKGROUND

The purpose of a bearing in an electric motor is to support and locate the rotor, to keep the air gap small and consistent and transfer the loads from the shaft to the motor. As such, bearings, e.g., sleeve bearings, can create a lot of heat during operation. Failure to cool the bearings may lead to overheating, which may shorten the lifespan of the electric motor.

There are many advantages for electric motors having internal cooling system. For example, the internal cooling system may keep the electric motors running at a consistent temperature, which may increase the efficiency and lifespan of the electric motors. However, one technical difficulty is how to improve efficiency of the internal cooling system.

Therefore, there is a need for an efficient internal cooling system and a cooling method for sleeve bearing motors. The presently disclosed subject matter addresses these and other needs as discussed in detail below.

SUMMARY OF THE INVENTION

The present disclosure provides an electric motor, comprising: a motor fan located proximate a first end of the electric motor; a sleeve bearing disposed between a rotating portion of the electric motor and a non-rotating portion of the electric motor, the sleeve bearing located proximate a second end of the electric motor opposite the first end; at least one air intake configured to receive an airflow from the motor fan and direct the airflow toward the second end of the electric motor; and an air discharge box coupled to a longitudinal end of the at least one air intake and configured to direct the airflow received into the air discharge box toward the sleeve bearing.

The present disclosure also provides a method for cooling a sleeve bearing of an electric motor, comprising: directing airflow into at least one air intake of the electric motor via a motor fan located proximate a first end of the electric motor; directing the airflow, via the at least one air intake, toward a second end of the electric motor opposite the first end; receiving the airflow from the at least one air intake to an air discharge box located proximate the second end of the electric motor; and directing the airflow from the air discharge box toward the sleeve bearing.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time consuming but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments described below with respect to one implementation are not intended to be limiting.

Figure 1:
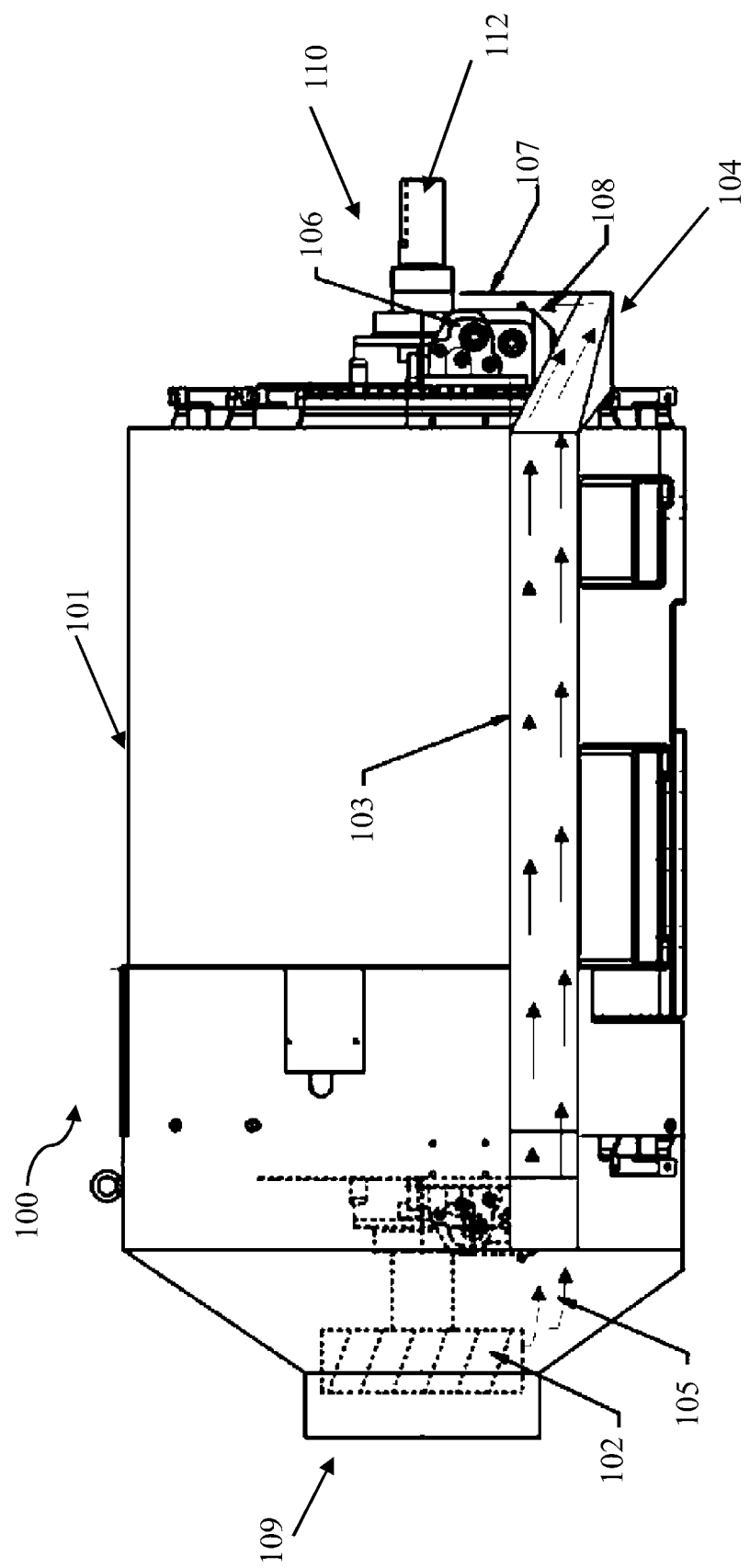
FIG. 1 illustrates an exemplary side view of an electric motor with a sleeve bearing enhanced cooling system, in accordance with an embodiment of the present disclosure.

The present disclosure provides for systems and methods for cooling an electric motor. With reference to the figures, FIG. 1 illustrates an exemplary side view of an exemplary electric motor 100 with a sleeve bearing enhanced cooling system. As shown, the sleeve bearing enhanced cooling system may comprise a motor fan 102, one or more air intakes 103, and an air discharge box 104. In one embodiment, the cooling system is within the electric motor. In a more specific example, the cooling system is within a housing 101 of the electric motor 100.

In the embodiment illustrated in FIG. 1, the motor fan 102 is configured to provide cool air to the one or more air intakes 103 to form a cool airflow 105. In one example, the cool air may be ambient temperature air from outside the electric motor 100. Next, the cool airflow 105 may be delivered to the sleeve bearing 106 from the one or more air intakes 103 through the air discharge box 104. In one embodiment, the cooling system is configured to deliver the cool airflow 105 directly to the drive end sleeve bearing fins to create a forced convection cooling mechanism. In one example, the forced convection cooling mechanism is achieved by delivering the cool airflow 105 through the air discharge box 104, wherein the air discharge box 104 is configured to supply the cool air to the sleeve bearing 106.

In a more specific example, the air discharge box 104 is configured to supply the cool air to the sleeve bearing fins intended to cool the oil sump. In some embodiments, as shown, the air discharge box 104 may comprise an extended airflow guide 107. In one example, the airflow guide 107 may form a cooling chamber 108 that delivers the cool air 105 to the sleeve bearing 106. In one example, the cooling system may lower the temperature at the drive end sleeve bearing by several degrees centigrade.

Figure 2:
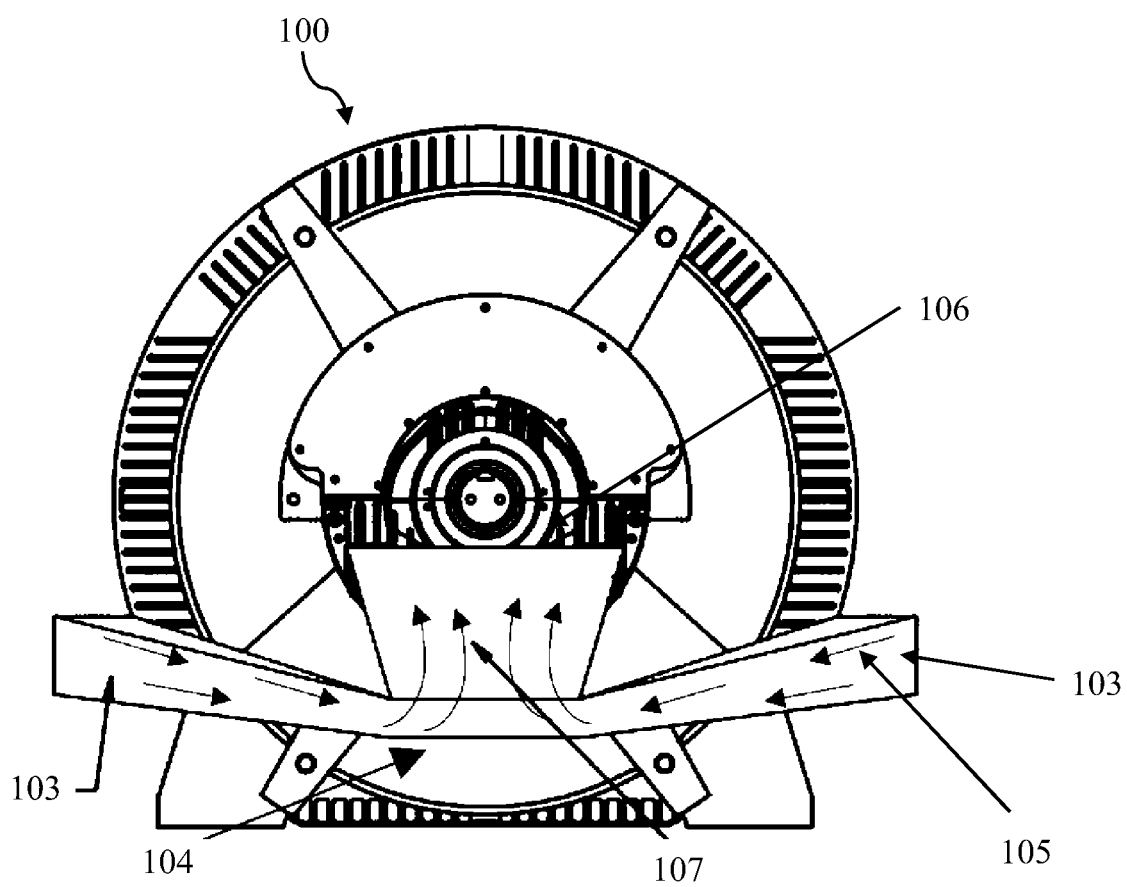
FIG. 2 illustrates an exemplary front view of the electric motor with the sleeve bearing enhanced cooling system, in accordance with an embodiment of the present disclosure.

FIG. 2 illustrates an exemplary front view of the electric motor 100 with the sleeve bearing enhanced cooling system shown in FIG. 1. As shown, the cool airflow 105 is delivered to the sleeve bearing 106 from the one or more air intakes 103 through the air discharge box 104 and the airflow guide 107.

In some embodiments, without limitations, the electric motor 100 is an induction motor. In some embodiments, without limitations, the motor fan 102 may be an external fan. The motor fan 102 may be a fan that is typically built into such electric motors, for example, to provide cooling of one or more components of the electric motor on the side of the electric motor opposite the drive side. In some examples, the motor fan 102 may be mounted to one side 109 of the housing 101 of the electric motor 100 (opposite a drive side 110 of the electric motor 100) and may be configured to transport ambient temperature air outside the electric motor 100 into the one or more air intakes 103. In one example, the motor fan 102 may be an axial-flow fan, a centrifugal fan, or a tangential fan. As an example, the axial-flow fan may be a propeller fan, a tubeaxial fan, or a vaneaxial fan.

In some examples, without limitations, the sleeve bearing 106 may be a flanged bearing or a cylindrical bearing. The sleeve bearing 106 may comprise any suitable materials, such as bronze, steel, stainless steel, brass, or plastic. In some embodiments, the sleeve bearing 106 may be lubricated. Different types and/or materials of the sleeve bearing 106, and the type of lubricant may influence the operating range temperatures of the sleeve bearing 106. The sleeve bearing 106, as shown, may be located proximate or at the drive side 110 of the electric motor 100. The sleeve bearing 106 may be located between a rotating portion of the electric motor (e.g., rotor 112) and a non-rotating portion of the electric motor (e.g., a stator within the housing 101).

In one or more embodiments, the one or more air intakes 103 are one or more ducts. In some examples, without limitations, the one or more ducts may be flexible ducts, rigid ducts, semi-rigid ducts, and/or efficient ducts. The one or more ducts may be any suitable size, shape, and combinations thereof. As an example, the ducts may be rectangular, substantially rectangular, rounded, circular, and/or oval in cross-section. In the example illustrated in FIGS. 1 and 2, the ducts are rectangular shaped in cross-section along their lengths. In the example illustrated in FIGS. 4 and 5, the ducts are circular shaped in cross-section along their lengths. The ducts may comprise any suitable materials, such as galvanized steel, stainless steel, aluminum, fiberglass ducting board, polyurethane, and flexible ducting materials. In some examples, flexible ducts material may include polyvinyl chloride (PVC), polyester, plastic, stainless steel, and combinations thereof. In some embodiments, the size and shape of the ducts may be designed so as to be compatible with the structure of the electric motor 101.

The one or more air intakes 103 may each comprise any desired shape, size, or arrangement of duct configured to carry the airflow 105 from the motor fan 102 proximate the end 109 of the electric motor 100 toward the opposite drive end 110 of the electric motor 100. A first end of each air intake 103 may be open to a portion of the housing 101 in which the motor fan 102 is located, while a second end of each air intake 103 opposite the first end may be coupled (e.g., directly coupled) to the air discharge box 104. Although two air intakes 103 are illustrated in FIG. 2 coming around opposite sides of electric motor 100 and meeting at the air discharge box 104, other embodiments of the electric motor 100 may have other numbers (e.g., one, three, four, five, six, seven, eight, or more) of air intakes 103. The air intakes 103 shown in FIGS. 4 and 5 may be structured in a similar manner as described above.

As shown in FIGS. 1 and 2, the cross-section of each air intake 103 may narrow at a longitudinal end of the air intake 103 proximate the air discharge box 104. This may increase the velocity of the airflow 105 moving through the air intake 103, into the air discharge box 104, and out of the air discharge box 104 to be directed to the sleeve bearing 106 via the extended airflow guide 107.

Figure 3:
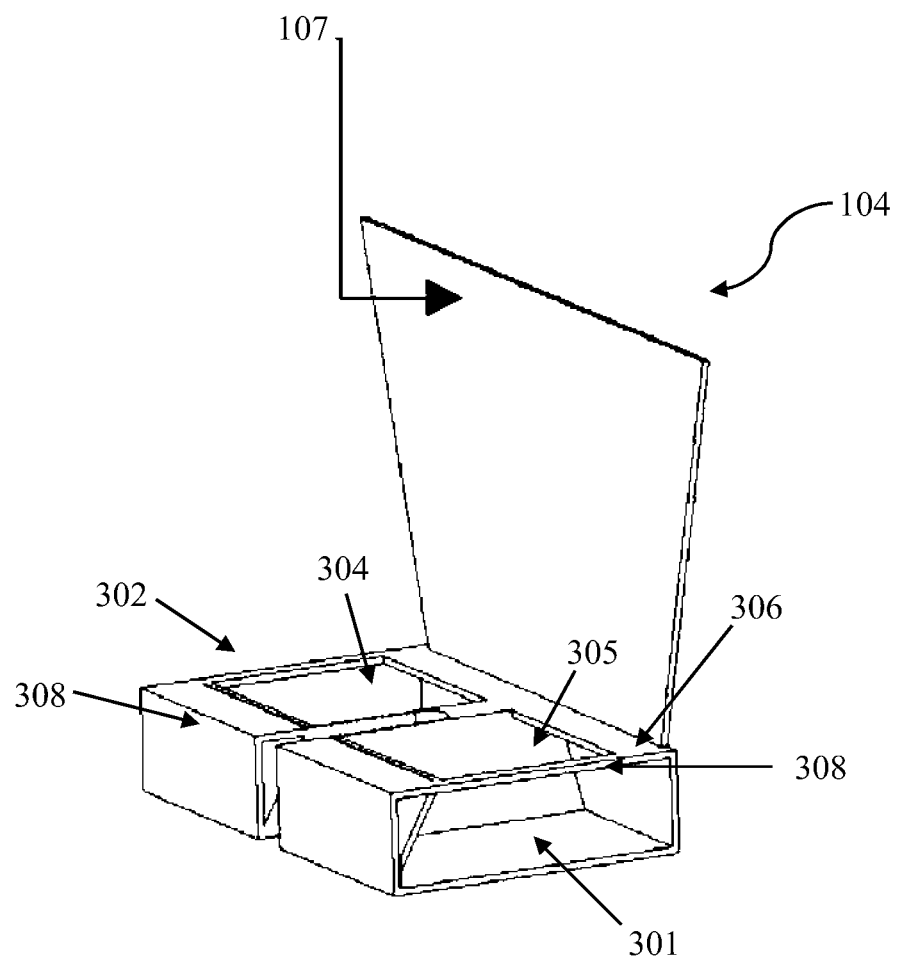
FIG. 3 illustrates an exemplary embodiment of an air discharge box, in accordance with an embodiment of the present disclosure.

FIG. 3 illustrates an exemplary embodiment of an air discharge box 104. As illustrated, the air discharge box 104 may comprise two discharge openings 301 and 302, but the air discharge box is not limited to such a configuration. In one example, each of the discharge openings 301 and 302 is connected to a different air intake (e.g., a duct pipe). In a more specific example, each discharge opening 301, 302 is connected to a corresponding rectangular duct pipe (i.e., air intakes 103) as shown in FIGS. 1 and 2. The discharge openings 301 and 302 may be connected directly to the different air intakes. As illustrated, the discharge openings 301 and 302 may be located along the sides of the air discharge box 104. In certain embodiments, the discharge openings 301 and 302 may be located along opposite sides of the air discharge box 104. Other numbers and arrangements of discharge openings may be provided in the air discharge box 104 in other embodiments.

As illustrated, the air discharge box 104 may also comprise two upward facing openings 304 and 305, but the air discharge box is not limited to such a configuration. For example, the air discharge box 104 may include a single upward facing opening in other embodiments. In one example, each of the upward facing openings 304 and 305 is open to a space (e.g., cooling chamber 108 of FIG. 1) above the air discharge box 104 and proximate the extended airflow guide 107. The upward facing openings 304 and 305 may be located along an upper surface 306 of the air discharge box 104. The air discharge box 104 may comprise one or more box portions 308 forming one or more channels between the discharge openings 301 and 302 and one or more upward facing openings 304 and 305.

As illustrated, the air discharge box 104 may further comprise an extended airflow guide 107. In some embodiments, the extended airflow guide 107 may form an angle with a box portion 308 of the discharge box 104. In one example, without limitations, the angle between the airflow guide 107 and the upper surface 306 of the box portion 308 of the discharge box 104 may be between 30° and 150°, more particularly between 60° and 120°, more particularly between 80° and 100°, or more particularly approximately 90°. In one embodiment, the airflow guide 107 is configured to force the ambient temperature air from the discharge box 104 through sleeve bearing cooling fins of the sleeve bearing (e.g., 106 of FIGS. 1 and 2), increasing the sleeve bearing cooling potential and cooling the drive end sleeve bearing.

Figure 4:
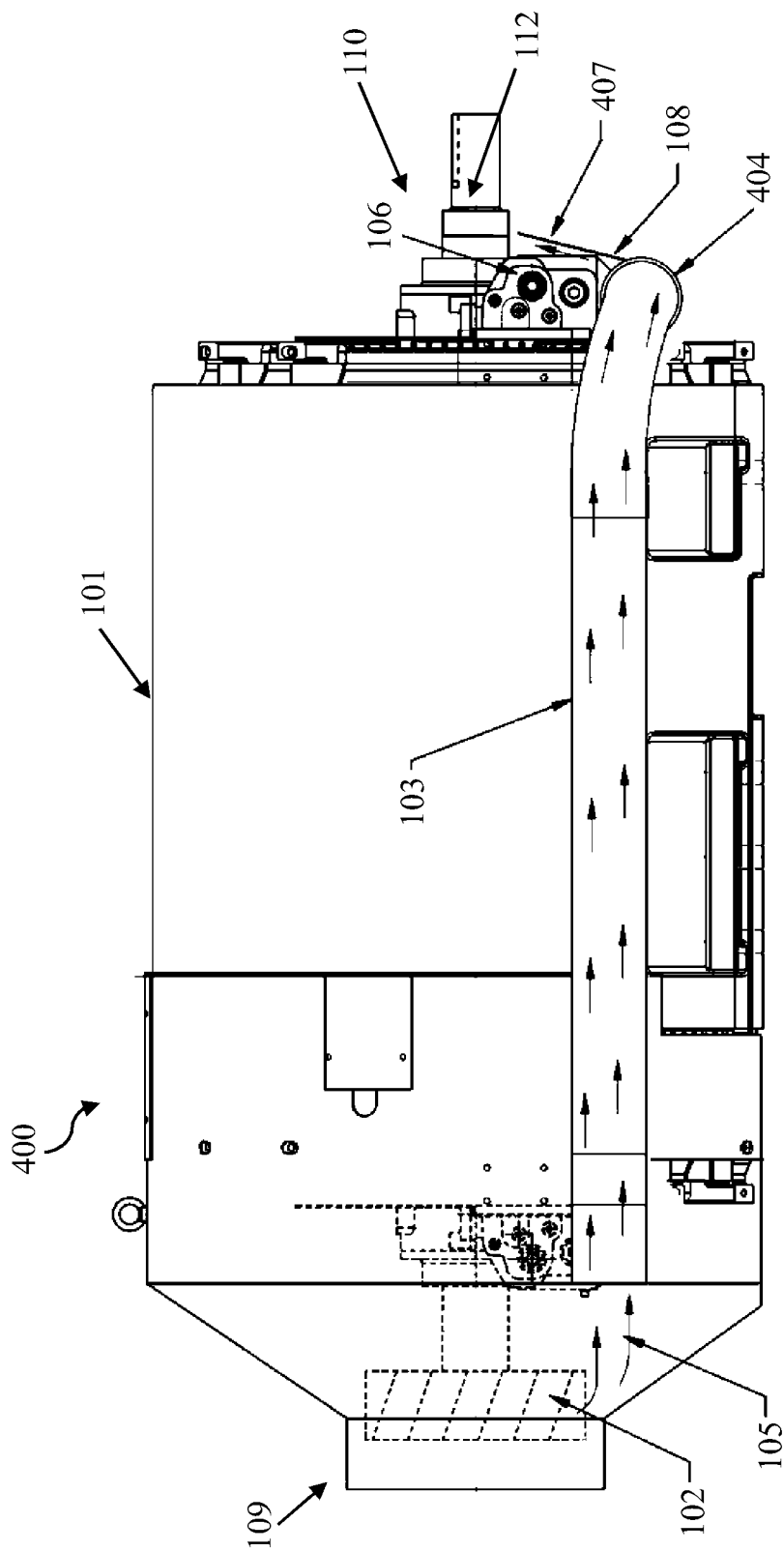
FIG. 4 illustrates another exemplary side view of an electric motor with a sleeve bearing enhanced cooling system, in accordance with an embodiment of the present disclosure.
Figure 5:
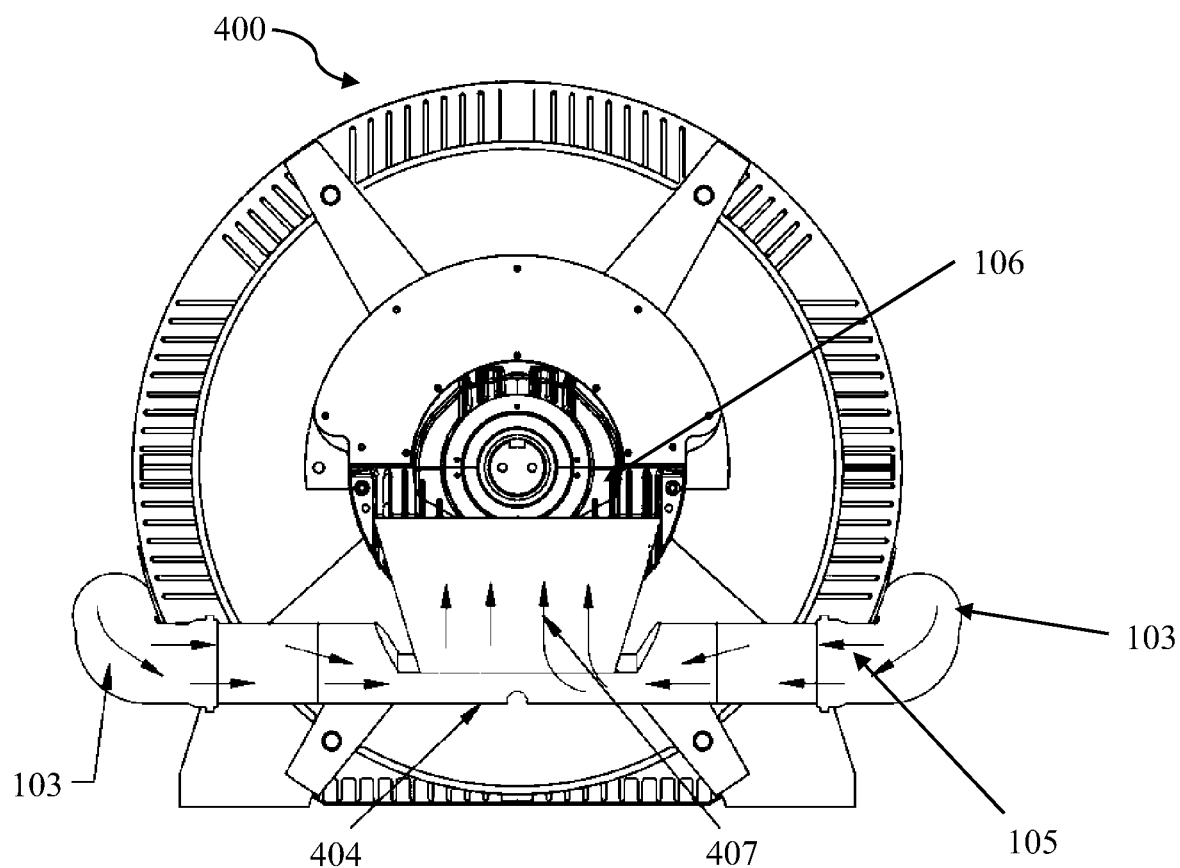
FIG. 5 illustrates another exemplary front view of the electric motor with the sleeve bearing enhanced cooling system, in accordance with an embodiment of the present disclosure.
Figure 6:
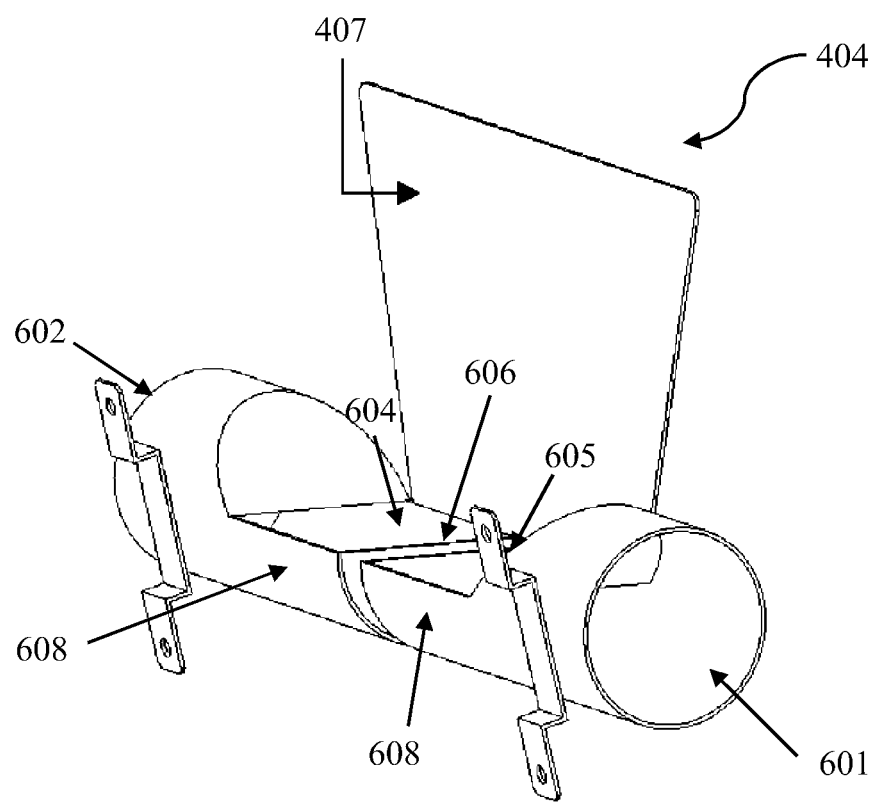
FIG. 6 illustrates another exemplary embodiment of an air discharge box, in accordance with an embodiment of the present disclosure.

FIGS. 4-6 illustrate another exemplary electric motor 400 with a sleeve bearing enhanced cooling system. As shown, the sleeve bearing enhanced cooling system may comprise a motor fan 102, one or more air intakes 103, and an air discharge box 404. The cooling system illustrated in FIGS. 4 and 5 operates similarly to the cooling system shown in FIGS. 1 and 2. In this example, the motor fan 102 is configured to provide cool air to the one or more air intakes 103 to form a cool airflow 105 and the cool airflow 105 is delivered to the sleeve bearing 106 through the air discharge box 404. In one embodiment, the cooling system is configured to deliver the cool airflow 105 directly to the drive end sleeve bearing fins to create a forced convection cooling mechanism. In one example, the forced convection cooling mechanism is achieved by delivering the cool airflow 105 through the air discharge box 404, wherein the air discharge box 404 is configured to supply the cool air to the sleeve bearing 106. In a more specific example, the air discharge box 404 is configured to supply the cool air to the sleeve bearing fins intended to cool the oil sump. In one example, the airflow guide 407 of the air discharge box 404 may form a cooling chamber 108 that delivers the cool air 105 to the sleeve bearing 106 of the electric motor 400. In one example, the cooling system may lower the temperature at the drive end sleeve bearing by several degrees centigrade.

In some embodiments, without limitations, the electric motor 400 is an induction motor. As shown in FIGS. 4 and 5, the motor fan 102 of the electric motor 400 may have a similar structure and function to the motor fan 102 described at length above with reference to FIGS. 1 and 2. For example, the motor fan 102 may be mounted to one side 109 of the housing 101 of the electric motor 100 (opposite a drive side 110 of the electric motor 100) and may be configured to transport ambient temperature air outside the electric motor 100 into the one or more air intakes 103.

As shown in FIGS. 4 and 5, the sleeve bearing 106 of the electric motor 400 may have a similar structure and function to the sleeve bearing 106 described at length above with reference to FIGS. 1 and 2. For example, the sleeve bearing 106 may be located proximate or at the drive side 110 of the electric motor 100. The sleeve bearing 106 may be located between a rotating portion of the electric motor (e.g., rotor 112) and a non-rotating portion of the electric motor (e.g., a stator within the housing 101).

As shown in FIGS. 4 and 5, the one or more air intakes 103 of the electric motor 400 may have a similar structure and function to the one or more air intakes 103 described at length above with reference to FIGS. 1 and 2. In the example illustrated in FIGS. 4 and 5, the one or more ducts of the one or more air intakes 103 of the electric motor 400 are round shaped (e.g., circular shaped). The one or more air intakes 103 may each comprise any desired shape, size, or arrangement of duct configured to carry the airflow 105 from the motor fan 102 proximate the end 109 of the electric motor 100 toward the opposite drive end 110 of the electric motor 400. A first end of each air intake 103 may be open to a portion of the housing 101 in which the motor fan 102 is located, while a second end of each air intake 103 opposite the first end may be coupled (e.g., directly coupled) to the air discharge box 404. Although two air intakes 103 are illustrated in FIG. coming around opposite sides of electric motor 400 and meeting at the air discharge box 404, other embodiments of the electric motor 400 may have other numbers (e.g., one, three, four, five, six, seven, eight, or more) of air intakes 103.

FIG. 6 illustrates another exemplary embodiment of an air discharge box 404. As illustrated, the air discharge box 404 may comprise two discharge openings 601 and 602, but the air discharge box 404 is not limited to such a configuration. In one example, each of the discharge openings 601 and 602 is connected to a different air intake (e.g., a duct pipe). In a more specific example, each discharge opening 601, 602 is connected to a corresponding round (e.g., circular) duct pipe (i.e., air intakes 103) as shown in FIGS. 4 and 5. The discharge openings 601 and 602 may be connected directly to the different air intakes. As illustrated, the discharge openings 601 and 602 may be located along the sides of the air discharge box 404. In certain embodiments, the discharge openings 601 and 602 may be located along opposite sides of the air discharge box 404. Other numbers and arrangements of discharge openings may be provided in the air discharge box 404 in other embodiments.

As illustrated, the air discharge box 404 may also comprise two upward facing openings 604 and 605, but the air discharge box is not limited to such a configuration. For example, the air discharge box 404 may include a single upward facing opening in other embodiments. In one example, each of the upward facing openings 604 and 605 is open to a space (e.g., cooling chamber 108 of FIG. 4) above the air discharge box 404 and proximate the extended airflow guide 407. The upward facing openings 604 and 605 may be located along an upper surface 606 of the air discharge box 404. The air discharge box 404 may comprise one or more box portions 608 forming one or more channels between the discharge openings 601 and 602 and one or more upward facing openings 604 and 605.

As illustrated, the air discharge box 404 may further comprise an extended airflow guide 407. In some embodiments, the extended airflow guide 407 may form an angle with a box portion 608 of the discharge box 404. In one example, without limitations, the angle between the airflow guide 407 and an upper edge 606 of the box portion 608 of the discharge box 404 may be between 30° and 150°, more particularly between 60° and 120°, more particularly between 80° and 100°, or more particularly approximately 90°. In one embodiment, the airflow guide 407 is configured to force the ambient temperature air from the discharge box 404 through sleeve bearing cooling fins of the sleeve bearing (e.g., 106 of FIGS. 4 and 5), increasing the sleeve bearing cooling potential and cooling the drive end sleeve bearing.

As shown in FIGS. 4 and 5, the cross-section of each air intake 103 may not change (or may change less than approximately 10%) at a longitudinal end of the air intake 103 proximate the air discharge box 404. Instead, as shown in FIGS. 5 and 6, two opposite facing portions of the air discharge box 404 (forming two channels) may narrow from the discharge openings 601 and 602 at the ends of the air intakes 103 toward the center of the air discharge box 404 (e.g., toward the box portions 608 having openings 604 and 605). This may increase the velocity of the airflow 105 moving through the air discharge box 404 and out of the air discharge box 104 to be directed to the sleeve bearing 106 via the extended airflow guide 407.

Illustrated Embodiments ("Embodiments") include at least the following:

Embodiment 1: An electric motor, comprising: a motor fan located proximate a first end of the electric motor; a sleeve bearing disposed between a rotating portion of the electric motor and a non-rotating portion of the electric motor, the sleeve bearing located proximate a second end of the electric motor opposite the first end; at least one air intake configured to receive an airflow from the motor fan and direct the airflow toward the second end of the electric motor; and an air discharge box coupled to a longitudinal end of the at least one air intake and configured to direct the airflow received into the air discharge box toward the sleeve bearing.

Embodiment 2: The electric motor of Embodiment 1, wherein at least one air intake comprises one or more ducts.

Embodiment 3: The electric motor of Embodiment 2, wherein the one or more ducts are round shaped.

Embodiment 4: The electric motor of Embodiment 2, wherein the one or more ducts are rectangle shaped.

Embodiment 5: The electric motor of Embodiment 2, wherein the air discharge box comprises one or more discharge openings, and the one or more discharge openings are connected to the one or more ducts.

Embodiment 6: The electric motor of Embodiment 5, wherein the one or more ducts comprise two ducts located on opposite sides of the electric motor and connected to two discharge openings on opposite sides of the air discharge box.

Embodiment 7: The electric motor of Embodiment 1, wherein the air discharge box comprises one or more upward facing openings configured to direct the airflow upwards out of the air discharge box.

Embodiment 8: The electric motor of Embodiment 7, wherein the air discharge box further comprises an airflow guide configured to direct the airflow output from the one or more upward facing openings toward the sleeve bearing.

Embodiment 9: The electric motor of Embodiment 7, further comprising one or more channels formed through the air discharge box that narrow from the one or more discharge openings toward the one or more upward facing openings.

Embodiment 10: The electric motor of Embodiment 1, wherein, for each air intake of the at least one air intake, a cross-section of the air intake narrows at the longitudinal end of the air intake proximate the air discharge box.

Embodiment 11: The cooling system of Embodiment 1, wherein the airflow received from the motor fan is ambient temperature air.

Embodiment 12: The cooling system of Embodiment 1, wherein the motor fan is an axial-flow fan, a centrifugal fan, or a tangential fan.

Embodiment 13: The cooling system of Embodiment 1, wherein the sleeve bearing is a flanged bearing or a cylindrical bearing.

Embodiment 14: A method for cooling a sleeve bearing of an electric motor, comprising: directing airflow into at least one air intake of the electric motor via a motor fan located proximate a first end of the electric motor; directing the airflow, via the at least one air intake, toward a second end of the electric motor opposite the first end; receiving the airflow from the at least one air intake to an air discharge box located proximate the second end of the electric motor; and directing the airflow from the air discharge box toward the sleeve bearing.

Embodiment 15: The method of Embodiment 14, further comprising moving the airflow discharged from the air discharge box over drive end sleeve bearing fins of the sleeve bearing.

Embodiment 16: The method of Embodiment 15, further comprising providing forced convection cooling to the sleeve bearing via the airflow moving over the drive end sleeve bearing fins.

Embodiment 17: The method of Embodiment 14, further comprising increasing a velocity of the airflow being directed toward or through the air discharge box.

Embodiment 18: The method of Embodiment 14, further comprising directing the airflow output from the air discharge box toward the sleeve bearing via an extended airflow guide of the air discharge box.

Embodiment 19: The method of Embodiment 14, comprising: directing the airflow into two air intakes on opposite sides of the electric motor via the motor fan; directing the airflow, via the two air intakes, toward the second end of the electric motor opposite the first end; and receiving the airflow into two openings on opposite sides of the air discharge box.

Embodiment 20: The method of Embodiment 14, further comprising directing the airflow upwards out of the air discharge box toward the sleeve bearing through one or more upward facing openings of the air discharge box.

Although the presently disclosed subject matter and its advantages have been described in detail, it should be understood that various changes, substitutions and alterations can be made herein without departing from the spirit and scope of the disclosed subject matter as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the presently disclosed subject matter, processes, machines, manufacture, compositions of matter, means, methods, or steps, presently existing or later to be developed that perform substantially the same function or achieves substantially the same result as the corresponding embodiments described herein can be utilized according to the presently disclosed subject matter. Accordingly, the appended claims are intended to include within their scope such processes, machines, manufacture, compositions of matter, means, methods, or steps.

What is claimed is:

1. An electric motor, comprising:
   a motor fan located proximate a first end of the electric motor;
   a sleeve bearing disposed between a rotating portion of the electric motor and a non-rotating portion of the electric motor, the sleeve bearing located proximate a second end of the electric motor opposite the first end;
   at least one air intake configured to receive an airflow from the motor fan and direct the airflow toward the second end of the electric motor; and
   an air discharge box coupled to a longitudinal end of the at least one air intake and configured to direct the airflow received into the air discharge box toward the sleeve bearing, wherein the air discharge box comprises one or more upward facing openings configured to direct the airflow upwards out of the air discharge box.

2. The electric motor of claim 1, wherein at least one air intake comprises one or more ducts.

3. The electric motor of claim 2, wherein the one or more ducts are round shaped.

4. The electric motor of claim 2, wherein the one or more ducts are rectangle shaped.

5. The electric motor of claim 2, wherein the air discharge box comprises one or more discharge openings, and the one or more discharge openings are connected to the one or more ducts.

6. The electric motor of claim 5, wherein the one or more ducts comprise two ducts located on opposite sides of the electric motor and connected to two discharge openings on opposite sides of the air discharge box.

7. The electric motor of claim 1, wherein the air discharge box further comprises an airflow guide configured to direct the airflow output from the one or more upward facing openings toward the sleeve bearing.

8. The electric motor of claim 1, further comprising one or more channels formed through the air discharge box that narrow from the one or more discharge openings toward the one or more upward facing openings.

9. The electric motor of claim 1, wherein, for each air intake of the at least one air intake, a cross-section of the air intake narrows at the longitudinal end of the air intake proximate the air discharge box.

10. The electric motor of claim 1, wherein the airflow received from the motor fan is ambient temperature air.

11. The electric motor of claim 1, wherein the motor fan is an axial-flow fan, a centrifugal fan, or a tangential fan.

12. The electric motor of claim 1, wherein the sleeve bearing is a flanged bearing or a cylindrical bearing.

13. A method for cooling a sleeve bearing of an electric motor, comprising:
   directing airflow into at least one air intake of the electric motor via a motor fan located proximate a first end of the electric motor;
   directing the airflow, via the at least one air intake, toward a second end of the electric motor opposite the first end;
   receiving the airflow from the at least one air intake to an air discharge box located proximate the second end of the electric motor; and
   directing the airflow upwards out of the air discharge box toward the sleeve bearing through one or more upward facing openings of the air discharge box.

14. The method of claim 13, further comprising moving the airflow discharged from the air discharge box over drive end sleeve bearing fins of the sleeve bearing.

15. The method of claim 14, further comprising providing forced convection cooling to the sleeve bearing via the airflow moving over the drive end sleeve bearing fins.

16. The method of claim 13, further comprising increasing a velocity of the airflow being directed toward or through the air discharge box.

17. The method of claim 13, further comprising directing the airflow output from the air discharge box toward the sleeve bearing via an extended airflow guide of the air discharge box.

18. The method of claim 13, further comprising:
   directing the airflow into two air intakes on opposite sides of the electric motor via the motor fan;
   directing the airflow, via the two air intakes, toward the second end of the electric motor opposite the first end; and
   receiving the airflow into two openings on opposite sides of the air discharge box.

* * * * *